United States Patent [19]

Janssen et al.

[11] Patent Number: 5,442,414
[45] Date of Patent: Aug. 15, 1995

[54] HIGH CONTRAST ILLUMINATION SYSTEM FOR VIDEO PROJECTOR

[75] Inventors: Peter J. Janssen, Scarborough; Jeffrey A. Shimizu, Peekskill, both of N.Y.

[73] Assignee: U. S. Philips Corporation, New York, N.Y.

[21] Appl. No.: 241,093

[22] Filed: May 10, 1994

[51] Int. Cl.⁶ .............................................. G03B 21/28
[52] U.S. Cl. .................................... 353/98; 353/122; 348/771; 359/224; 359/291
[58] Field of Search ...................... 353/31, 37, 98, 99, 353/122, 97; 348/771, 770, 755, 756, 764; 359/291, 292, 224, 223, 846; 345/108

[56] References Cited

U.S. PATENT DOCUMENTS

| | | | |
|---|---|---|---|
| 3,989,890 | 11/1976 | Nathanson et al. | 348/771 |
| 4,592,628 | 6/1986 | Altman et al. | 348/771 |
| 4,615,595 | 10/1986 | Hornpeck | 353/122 |
| 4,641,193 | 2/1987 | Glenn | 348/771 |
| 5,159,485 | 10/1992 | Nelson | 353/122 |
| 5,245,369 | 9/1993 | Um et al. | 353/122 |
| 5,319,214 | 6/1994 | Gregory et al. | 359/291 |

Primary Examiner—William A. Cuchlinski, Jr.
Assistant Examiner—William C. Dowling
Attorney, Agent, or Firm—Michael J. Balconi-Lamica

[57] ABSTRACT

A high contrast illumination system particularly suitable for use with light valves that have an array of reflective pivotable pixels. The light valve is arranged in light path which extends from a projection lamp to a projection lens. By the action of the pivotable pixels the light is directed either into the projection lens (ON) or away from the projection lens (OFF) to modulate the light with video information. An asymmetric aperture is disposed in the light path with its longitudinal axis located along the pivot axis of the pixels. This configuration provides maximum brightness without adversely affecting contrast. The system may be used in either a monochrome or color (RGB) system and in single or multiple light valve systems.

16 Claims, 2 Drawing Sheets

HIGH CONTRAST ILLUMINATION SYSTEM FOR VIDEO PROJECTOR

BACKGROUND AND SUMMARY OF THE INVENTION

This invention relates to projection video systems and specifically to projection video systems utilizing a light valve of the type known as a deformable mirror device.

Most commercially available projection video systems utilize separate projection paths for each of the three primary colors. The systems thus require red, green and blue light valves and optical paths which must be accurately converged on the screen which adds to complexity and expense. Recently, projection video systems utilizing only a single light valve have been developed. One such system is a color field sequential system, in which the normal video field, 1/60th of a second, is broken into three parts, or color subfields of 1/180th of a second.

During the three color sub-fields, the light valve is illuminated with red, green and blue light sequentially. While the light valve is illuminated with any given color, the video data corresponding to that color is displayed on the light valve. The eye then fuses the three color sub-fields into a single, full color field. The eye also fuses successive video fields into full motion, full color video. This system requires a device for sequentially illuminating the surface of the light valve with the three colors. The simplest of such devices is a color wheel which changes the color of a white projection lamp as it rotates.

Recently, improved light valves particularly suitable for use in projection television systems have become available. One such device is a so-called deformable mirror device (sometimes called a digital mirror device or DMD) which is illustrated in U.S. Pat. No. 5,079,544 (the disclosure of which is hereby incorporated by reference as if fully set forth herein) and patents referenced therein, in which the light valve consists of a array of tiny pivotable mirror-like pixels for deflecting a beam of light either to the display screen (on) or away from the display optics (off). This device is particularly suitable for use in a field sequential system because its pixels are capable of being switched very rapidly. By additional rapid switching of the pixels a grey scale is generated.

There is always a desire for greater brightness in projection video systems so that the brightness approaches or exceeds that of direct view (CRT) systems. In addition to a bright image, the image must also have good contrast so that the projected image does not appear "washed out". The present invention is directed towards providing an illumination system that has both increased brightness and increased contrast. A usual method of increasing brightness in a projection video system is to increase the aperture of the system. However, increasing the aperture generally increases the complexity and expense of the optical system and may reduce system contrast because the increased aperture permits more spurious light to enter the system. Where high contrast is of paramount importance many projection designs have decreased the aperture to increase the contrast, but at the expense of reduced brightness.

The present invention is adapted to the unique geometry of the DMD system in order to increase the brightness of the system without adversely affecting the contrast of the system. As in any projection system, the illumination system comprises a light path extending from a projection lamp to the projection lens. In this invention, an asymmetric aperture is located at one or more places along the light path. The asymmetric aperture is oriented such that the longitudinal axis of the asymmetric aperture is aligned with the pivot axis of each of the pixels (the longitudinal axis of the asymmetric aperture is thus orthogonal to the switching direction of the 10 pixels). If greater contrast enhancement is desired, the aperture can be further arranged so that it is narrower in the direction in which light is diffracted or scattered from the structure of the DMD. The asymmetric aperture can be disposed in the light path between the lamp and the DMD or after the DMD (i.e., in the projection lens) or at both places. The invention is useable in color or monochrome systems as well as systems using multiple light valves and multiple projection lamps.

BRIEF DESCRIPTION OF THE DRAWINGS

For a better understanding of the invention, reference is made to the following drawings which are to be taken in conjunction with the detailed specification to follow.

DETAILED DESCRIPTION OF THE PREFERRED EMBODIMENTS

Figure 1:
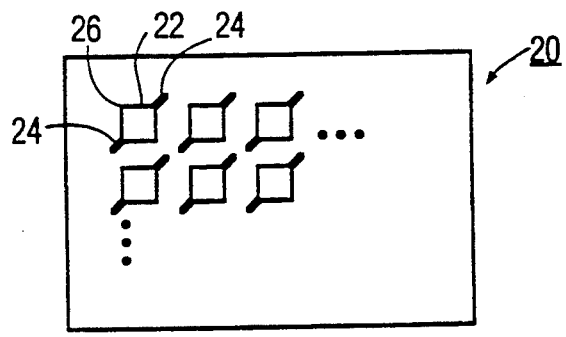
FIG. 1 is a schematic plan view of the surface of a DMD type light valve showing the orientation of the hinges of the individual pixels.
Figure 2:
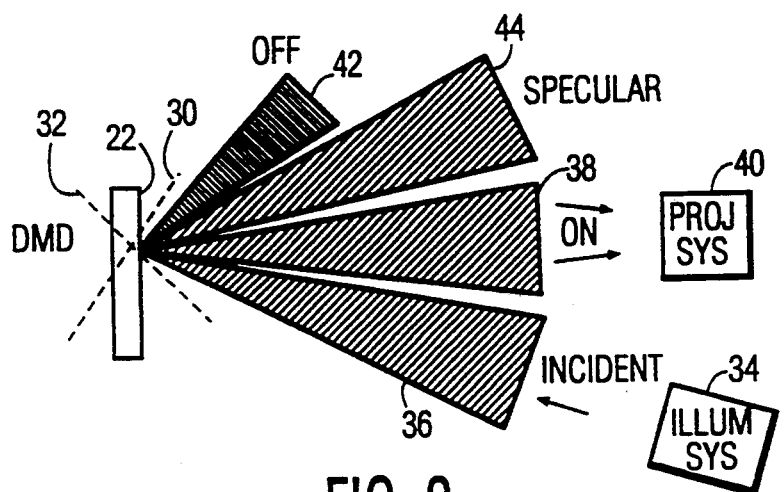
FIG. 2 is a diagram illustrating the angular separation of the incident, ON, specular and OFF beams in a DMD projection system.

FIG. 1 illustrates a light valve 20 in the form of a deformable mirror device (hereinafter referred to as "DMD") having an array of reflective pixels 22. Each pixel 22 is mounted so as to be pivotable about torsion hinges 24 which are located at two diagonal corners of each pixel 22. In operation when an appropriate ON voltage is applied to pixel 22, the upper lefthand corner 26 of pixel 22 will move upwardly from the plane of the DMD 20 while the lower righthand corner 28 will move downwardly. Similarly, when an OFF voltage is applied, pixel 22 will pivot about torsion hinges 24 so that corner 26 moves downwardly and corner 28 moves upwardly. Thus the ON and OFF positions comprise two distinct movements of each pixel 22. Generally, pixels 22 can be pivoted by 10° to either side of planar. In the ON position, the incident illumination is reflected into the aperture of a projection lens. In the OFF position, the incident illumination is reflected outside the aperture of the projection lens and thus does not reach the viewing screen. This operation is illustrated in FIG. 2. The present invention is also applicable to DMD's of the so called "hidden hinge" configuration in which the hinges for the individual pixels are disposed underneath the pixels.

FIG. 2 illustrates the light path resulting from the switching of pixels 22. In FIG. 2, the dotted line 30 illustrates the position of pixel 22 when pivoted into its ON position and dotted line 32 illustrates the position of pixel 22 when pivoted into its OFF position. The vertical solid line illustrates the planar position of pixels 22 (neither ON nor OFF). An illumination system schematically illustrated at 34 provides a beam of incident light 36 upon the surface of each pixel 22. When pixel 22 is in ON position 30, the incident beam 36 will be reflected as a beam 38 to a projection system 40 which will project beam 38 onto the viewing screen. When pixel 22 is activated and pivoted into its OFF position 32, incident beam 36 will be reflected to an "OFF" beam 42 which is outside of the angle of acceptance of the projection system 40, so that no light will reach the projection screen from the OFF position of pixel 22.

In actuality, ON beam 38 and OFF beam 42 are not the only beams reflected from DMD 20. Additionally, there is a specular beam 44 which is reflected from the window covering DMD 20 as well as from the inter-pixel structure. Specular beam 44 has no information content and represents optical system "noise". Projection system 40 and illumination system 34 should be designed so as to reduce the effect of specular beam 44 which will raise the black level, thus reducing overall contrast in the projection system. The projection system must separate each of the four beams 36, 38, 44 and 42 in order to provide adequate contrast, thus the angular acceptance of projection system 40 is generally limited to less than ±10°. If one attempts to limit the angle of acceptance of the projection system to a greater degree, system brightness will be reduced.

Figure 3:
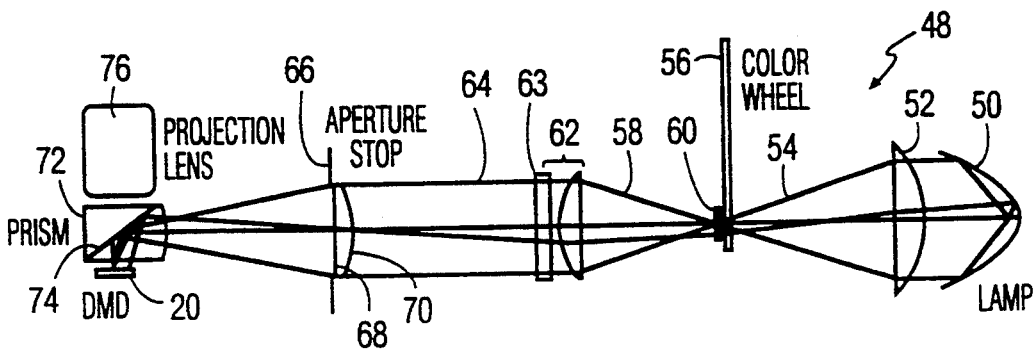
FIG. 3 is an illustration of the overall illumination system for a video projection system.

FIG. 3 is a schematic representation of a video projection system 48 in accordance with the present invention. The system illustrated in FIG. 3 is a single panel full color (RGB) system. However, the principles of the present invention are not limited to single panel color systems and may be used in monochrome systems and multiple panel color systems as well. As shown in FIG. 3, a projection lamp 50 is used to provide a source of white light. Projection lamp 50 may include an integral reflector or be used in conjunction with a separate reflector. The light emitted from lamp 50 passes to a converging lens, or lens system 52 which is used to focus a beam 54 towards a color wheel 56. Color wheel 56 comprises a series of segments, or spokes, of red, green and blue transmission filters. Color wheel 56 is rotated about its axis so as to have its colored segments sequentially intercept light beam 54. After exiting color wheel 56, the now colored light beam 58 is acted upon by an imaging lens 60 and in turn passes to a condenser lens 62 and an integrator 63.

After exiting integrator 63 beam 64 is directed to an aperture plate 66 having an aperture 68 which has a configuration and alignment as is described in detail below. Also disposed at aperture plate 66 is a further integrator plate 70, the beam of light is then focussed towards a prism illuminator system 72. In prism system 72 light is reflected from a surface 74 which directs the light originating from lamp 0 onto the surface of DMD 20. In turn, prism system 72 is arranged so that the light which is reflected off the surface of DMD 20, and thus contains the modulated video information, is directed to a projection lens 76 for projection onto a viewing screen or surface (not shown). Prism system 72 may be of the configuration shown in U.S. Pat. No. 4,969,730 to van den Brandt. Integrators 63, 70 which form a uniform illumination beam may be one of those shown in U.S. Pat. No. 5,098,134 to van den Brandt et al. The disclosures of U.S. Pat. Nos. 4,969,730 and 5,098,134 are hereby incorporated by reference as if fully set forth herein.

Figure 4:
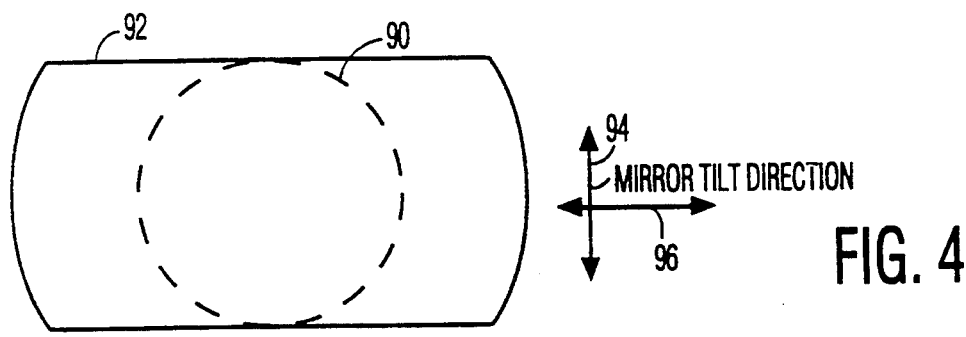
FIG. 4 is a diagram illustrating a comparison between a symmetric aperture and an asymmetric aperture as used in the light path of the illumination system.

FIG. 4 illustrates aperture configurations for use in DMD projection systems such as that illustrated in FIG. 3. In most optical systems, the optical system is designed to have an angle of acceptance of ±15° or less. Optical design, particularly that of the projection lens, becomes more difficult as the aperture increases. Thus to simplify the optical system, the aperture is limited to a practical value. However in devices such as DMDs, the DMD itself further limits the aperture in the switching direction, generally to that of ±8°. Generally in projection systems, the apertures are circular. A circular aperture having a beam acceptance of ±8° is shown as dotted line 90 in FIG. 4.

However, the angular acceptance of a DMD is limited only in the directions in which pixels 22 pivot. Thus, the aperture of the system can be increased in a direction orthogonal to the direction of tilt (in a direction parallel to the hinges 24 of pixels 22). In FIG. 4, an asymmetric aperture 92 having a 15° acceptance angle along the hinge direction with an 8° angle of acceptance along the mirror pivot (hinge) direction is shown. In FIG. 4, arrow 94 is oriented in the direction of pivoting of pixels 22 and arrow 96 shows the direction of the hinges 24 of individual pixels 22. Thus, it is seen that the longitudinal axis of asymmetric aperture 92 is oriented along the hinge axis. Put another way, symmetric aperture 90 has been elongated along the pivot axis.

Figure 5:
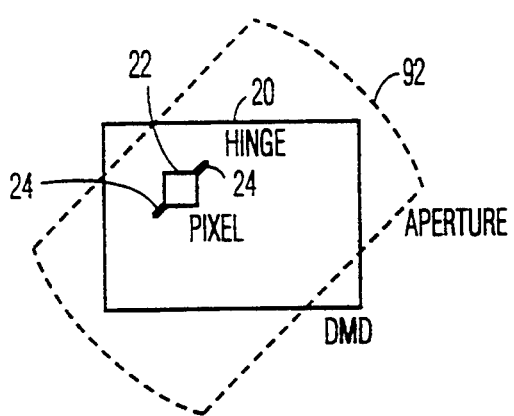
FIG. 5 illustrates the asymmetric aperture of FIG. 4 viewed along the optical axis of the system in relationship to the light valve.

FIG. 5 is a view along the optical axis of the projection system 48 and illustrates the orientation of asymmetric aperture 92 with respect to DMD 20 and pixels 22. As is seen in FIG. 5, asymmetric aperture 92 is aligned along the axis of the hinges 24 of each pixel 22 and thus is tilted at an angle of 45° with respect to the horizon of the image formed by DMD 20. In general, the brightness of the image is proportional to the area of the aperture and the area of asymmetric aperture 92 is 2.3 times the area of symmetric aperture 90. The actual increase in brightness realized depends upon the characteristics of the light source and the collection optics.

Figure 6:
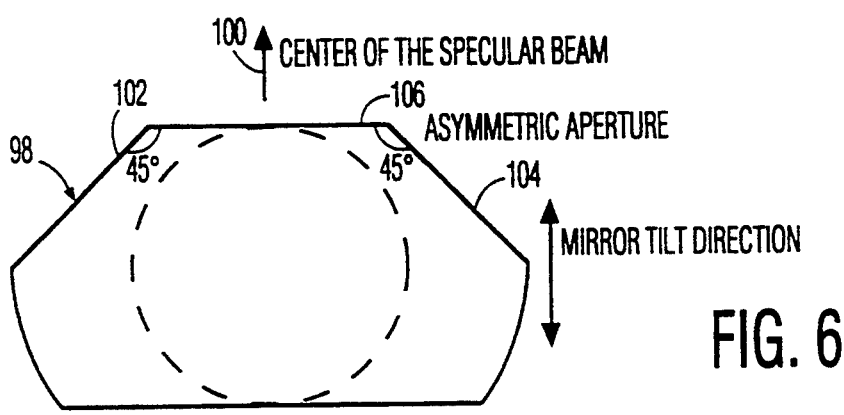
FIG. 6 illustrates a second embodiment of an asymmetric aperture for use with the invention.
Figure 7:
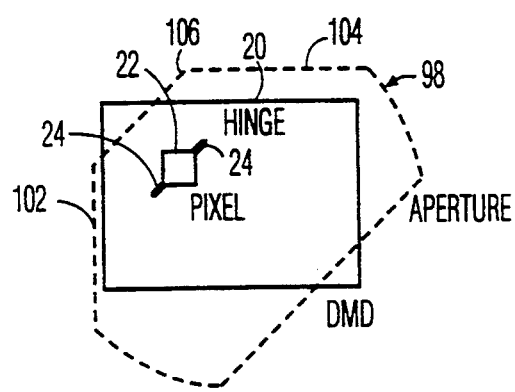
FIG. 7 illustrates the asymmetric aperture of FIG. 6 viewed along the optical axis of the system in relationship to the light valve.

In FIG. 4, the system aperture has been extended in the direction of hinges 24 (orthogonal to the mirror tilt direction). In a DMD system, this aperture configuration may lead to a reduced contrast ratio because a larger aperture may accept more spurious light in the OFF state. Furthermore, the distribution of the spurious light may be such that further shaping of the aperture is desirable. One contribution to loss in contrast is light which is diffracted from the pixel structure into the projection system. This diffracted light is oriented along the direction of the pixel edges which are at 45° to the mirror tilt direction. Accordingly, in order to improve contrast ratio, the system aperture may be shaped as shown in FIG. 6. In FIG. 6, another embodiment 98 of an asymmetric aperture is shown. In FIG. 6, asymmetric aperture 98 has been narrowed in the direction 100 towards the center of specular beam 44 as shown in FIG. 2. This will reduce the possibility of diffraction of light from the specular beam into the projection beam thus raising the contrast of the system. As is shown in FIG. 7 the edge 102 of aperture 98 will be aligned parallel to the side edges of pixels 22, while the edge 104 will be parallel to the upper and lower edges of pixels 22. As is seen in FIG. 6, edges 102, 104 extend at a 45° angle to upper wall 106 of aperture 98.

As noted above, the described embodiments are not limited to color systems and are equally applicable to monochrome systems. For example, a monochrome system similar to that shown in FIG. 3 would simply omit the color wheel and the circuitry used to drive the light valve for the three colors. Similarly, in color systems, many other methods, other than color wheels, may be used to generate three sequential colors of light. An RGB system may also be formed with three lamps, one for each primary color. The use of an aperture configured in accordance with the invention is also applicable to this type of illumination system as well, with an aperture disposed in each of the three illumination paths. Anamorphic lenses may also be used to shape the illumination beam into an asymmetric shape. In order to control the aperture of an optical system, a physical stop such as aperture plate and aperture 68 of the desired shape is placed at the system aperture stop or an image thereof. In addition, it is desirable that projection lens 76 also have an internal stop shaped to the desired form. As with most projection systems, the aperture stop of the illumination system should be imaged into the internal stop of the projection lens.

Although the present invention has been described as applied to a deformable mirror devices, the concept can be applied to any type of light valve. For example, the contrast ratio produced by a liquid crystal display (LCD) varies as a function of the incidence angle. Generally, this function is not circularly symmetric about normal incidents. Thus, an improved system brightness and/or an improved contrast ratio can be obtained by using a system aperture that is not circular symmetric.

The above-described arrangement is merely illustrative of the principles of the present invention. Numerous modifications and adaptations thereof will be readily apparent to those skilled in the art without departing from the spirit and scope of the present invention.

What is claimed is:

1. A video projection system comprising:
a light source;
a lens for projecting an image onto a viewing surface;
a light path extending between said light source and said lens;
a light valve disposed in said light path between said light source and said lens, said light valve having an array of pivotable reflective pixels, said pixels being pivoted about a pivot axis, said pixels reflecting light impinging thereon either into said lens or away from said lens to modulate light in accordance with video information input thereto; and
aperture means disposed in said light path, said aperture means having a long dimension and a short dimension, said aperture means being oriented in the light path with said long dimension being disposed parallel to the pivot axis of the pixels of said light valve.

2. The projection system as claimed in claim 1 further including means for sequentially altering the color of the light emitted by the light source with at least two different colors.

3. The projection system as claimed in claim 2 wherein said means for altering the color of the light emitted by the light source comprise a rotating wheel.

4. The projection system as claimed in claim 1 wherein said aperture means comprise straight edges along the long dimension and curved edges about the short dimension.

5. The projection system as claimed in claim 4 wherein said straight edges of said aperture means are of different length so that said aperture means is narrower along one longitudinal edge.

6. The projection system claimed in claim 1 wherein said aperture means are disposed between said lamp and said light valve.

7. The projection system as claimed in claim 1 wherein said aperture means is disposed within said lens.

8. The projection system as claimed in claim 1 further including a second aperture means disposed within said lens.

9. In a projection video system having a light source, a lens for projecting an image on a view surface, a light valve having an array of reflective pixels which are pivotable about a pivot axis and a light path extending from said light source to said lens, said light valve being arranged in the light path so as to modulate the light impinging thereon in accordance with video information applied therein, wherein the improvement comprises: asymmetric aperture means, said asymmetric aperture means being disposed in said light path, said asymmetric aperture means having a short axis and a long axis with the long axis of said asymmetric aperture being disposed and arranged parallel to the pivot axis of the pixels.

10. The projection system as claimed in claim 9 further including means for sequentially altering the color of the light of the light source.

11. The projection system as claimed in claim 10 wherein said means for altering the color of the light emitted by the light source comprises a rotating color wheel.

12. The projection system as claimed in claim 9 wherein said aperture means include straight edges along the long axis and curved edges about the short axis.

13. The projection system as claimed in claim 12 wherein said straight edges of said aperture means are of different length so that said aperture means is narrower along one of the edges along the long axis.

14. The projection system claimed in claim 9 wherein said aperture means are disposed between said light source and said light valve.

15. The projection system as claimed in claim 9 wherein said aperture means is disposed within said lens.

16. The projection system as claimed in claim 9 further including a second aperture means disposed within said lens.

* * * * *